UNITED STATES PATENT OFFICE.

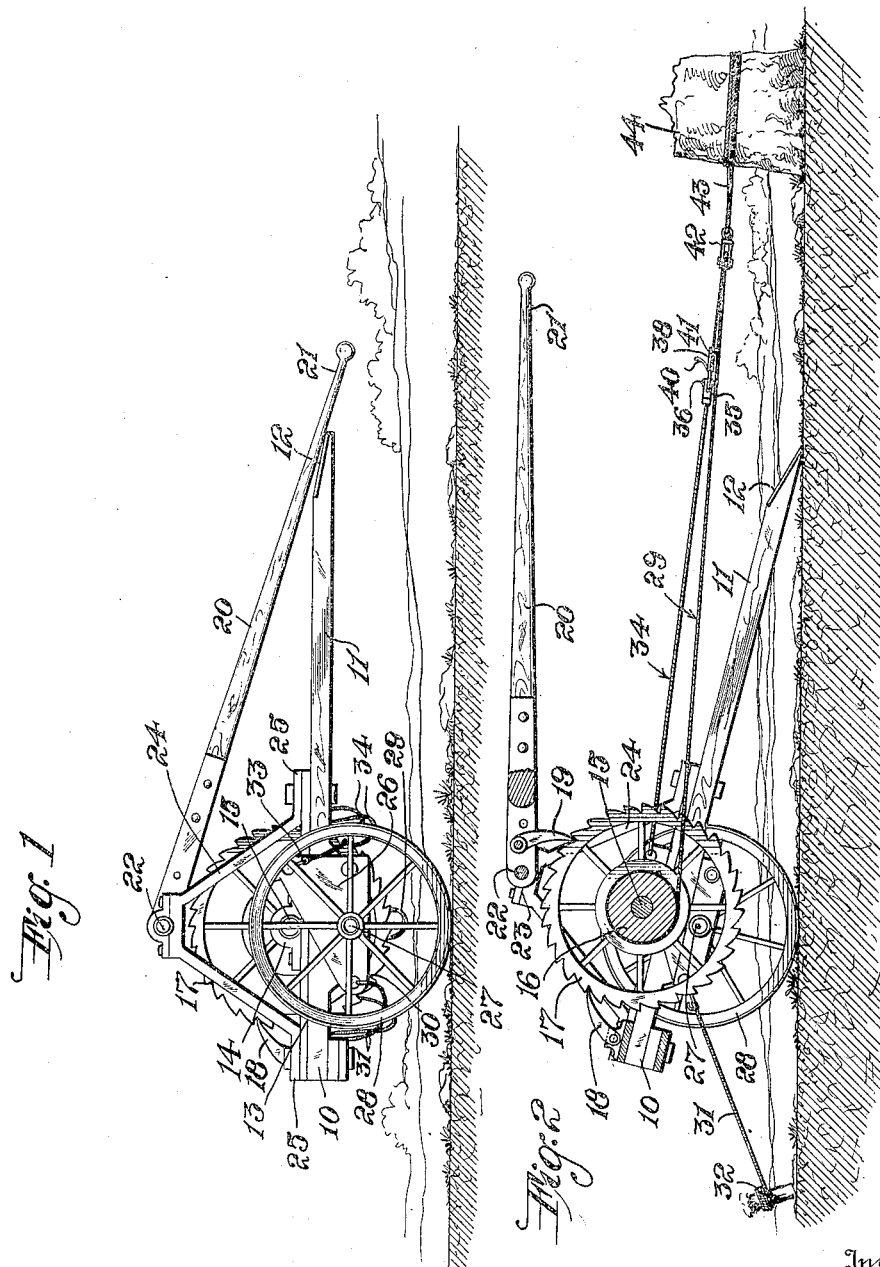

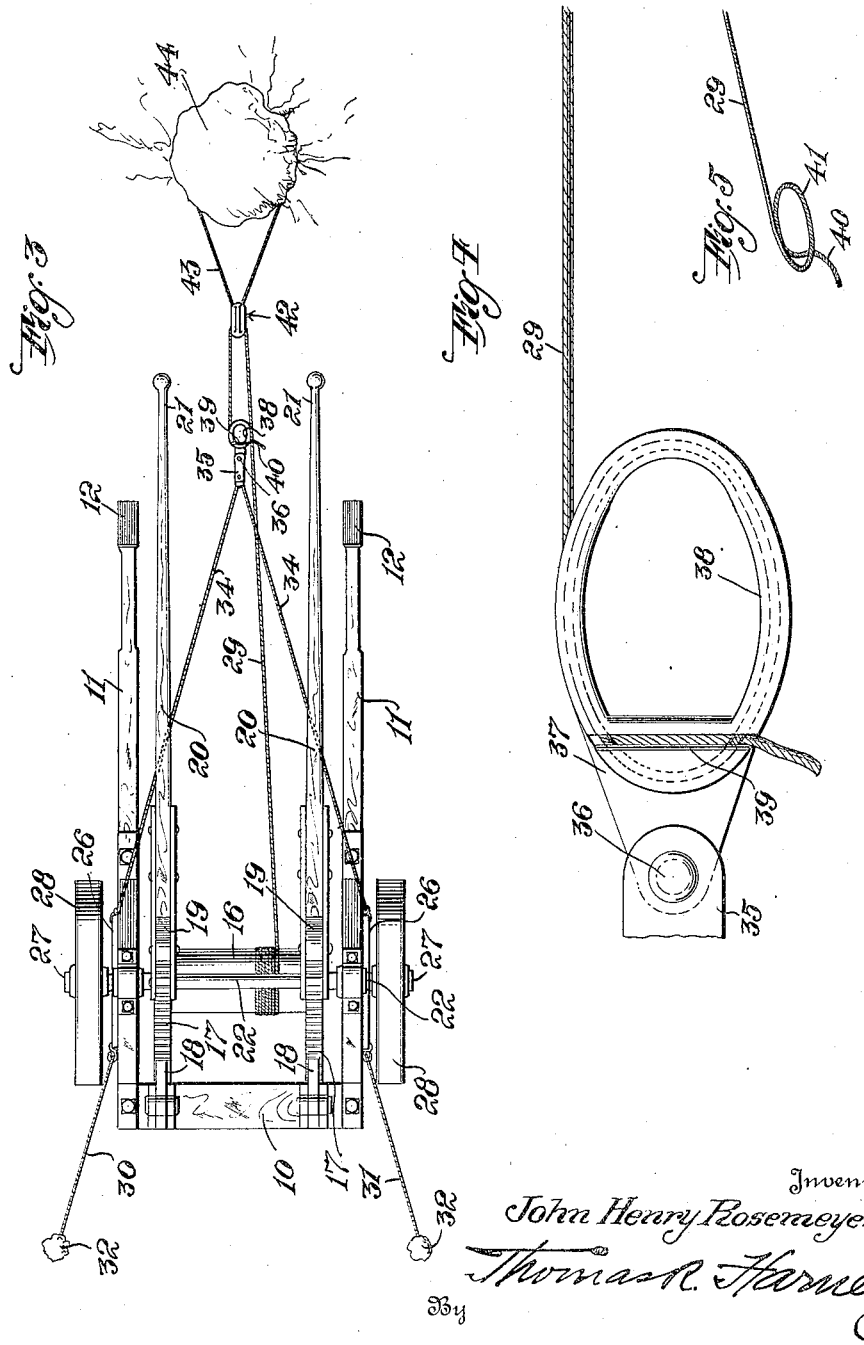

JOHN HENRY ROSEMEYER, OF ELMIRA, IDAHO.

STUMP-PULLER.

1,383,666.

Specification of Letters Patent.

Patented July 5, 1921.

Application filed July 13, 1920. Serial No. 395,879.

*To all whom it may concern:*

Be it known that I, JOHN H. ROSEMEYER, a citizen of the United States of America, residing at Elmira, in the county of Bonner and State of Idaho, have invented certain new and useful Improvements in Stump-Pullers, of which the following is a specification.

My present invention relates generally to stump pullers, and more particularly to a readily portable apparatus capable of being quickly set up in place and of effective operation for the intended purposes, and my object is the provision of a simple comparatively inexpensive apparatus which will be strong and durable in use.

In the accompanying drawings illustrating my invention and forming a part of this specification, Figure 1 is a side elevation showing the parts in position for transportation, Fig. 2 is a vertical longitudinal section through the apparatus in operative position, Fig. 3 is a top plan view, Fig. 4 is an enlarged top plan view of the cable connector or hitch, and Fig. 5 is a detail perspective view of the free end of the cable showing the same looped as it is looped in practice around the cable grip or hitch of Fig. 4.

Referring now to these figures my invention proposes an apparatus which includes a main U-shaped frame 10, having forwardly projecting parallel extensions 11 terminating at their free ends in beveled ground engaging shoes 12. The main frame 10 supports at its rear portion a second U-shaped frame 13 secured thereon and in turn supporting bearings 14 for the ends of a drum shaft 15 on which a winding drum 16 is disposed. This drum has ratchet wheels 17 at its opposite ends engaged by rear pawls 18 mounted in connection with the supplemental frame 13 and operating to prevent rearward rotation of the drum. The two ratchet wheels 17 are also engaged by pivoted pawls 19 of a pair of operating bars 20 having forward handle portions 21 adjacent to the forward ends of the main frame and having their rear ends pivoted on a shaft 22 whose ends are disposed in bearings 23 upon upstanding side brackets 24 whose feet 25 are bolted through the main frame 10 and the supplemental frame 13.

At opposite sides of the main frame a pair of triangular side plates 26 are securely mounted, which coöperate with the main frame in supporting stub axles 27 for the side wheels 28 on which the frame, in fact the apparatus as a whole is readily portable when the forward ends of the frame extensions 11 are raised from the ground and the frame is generally in the horizontal position shown in Fig. 1.

The operating bars 20 may be utilized independently or in conjunction with one another by one or two operators and each downward movement thereof serves to impart rotative movement to the drum 16 for the purpose of winding the stump pulling cable 29 thereon.

The side plates 26 have lower rear clevises or connecting members 30, to which flexible connections 31 are secured at one end. When the frame is set up for operation these flexible connections 31 are extended rearwardly and toward opposite sides as seen in Fig. 3 and securely fastened to anchors, either in the nature of driven posts 32 as in Fig. 3, or trees, bowlders or other natural anchors which may be handy.

To the upper forward portions of the side plates 26, clevises or connecting members 33 are fastened, and to these clevises are secured the opposite ends of a flexible connection 34 having at a point intermediate its ends running engagement with a shackle 35 pivotally connected at 36 with a cable connector or hitch 37 shown particularly in Figs. 3 and 4. This hitch is of oval shape as indicated at 38, and has a grooved periphery into which the free end of the stump pulling cable 29 may be extended. It is also provided with an inner upper transverse groove 39 through which the extremity 40 of the cable may be extended beneath one side portion of the loop 41 which extends around and within the peripheral groove of the hitch or connector as seen in Fig. 5 so as to thus effectively lock the cable in connection with the hitch.

In extending the stump pulling cable 29 from the drum 16, it is first passed through a block 42, which block carries a stump attaching cable 43, and after passage through the block 42 the pulling cable 29 is then adjustably connected to the hitch 38 so that with the stump attaching cable 43 properly attached around a stump 44 to be pulled as in Figs. 2 and 3, strain in operation will be supported through the side plates 26 and the anchoring cables or connections 31 so as to relieve the main frame of substantial portions of the load and strain, giving greater and more effective life to the frame or rather the device as a whole.

It is thus obvious, from a comparison of Figs. 1 and 2, that when setting up the machine for operation it is simply necessary to drop its ground engaging shoes 12 into contact with the ground and extend the anchoring cables 31 around driven posts or other artificial or permanent anchors. The stump attaching cable 43 is then extended around the stump and the free end of the pulling or winding cable 29 is extended through the block 42 and secured in adjusted position to the connector or hitch 37 in the manner most plainly seen in Fig. 3. With the parts in this position the operating bars 20 are shifted vertically, either in unison or in alternately opposite directions, by one or two operators, and as above explained, the pulling strain thrown on the parts in operation is taken more particularly by the side plates 26 so as to relieve undue strain upon the frame and thus promote the foregoing advantages as regards strength and durability.

I claim:

1. A stump puller comprising a main U-shaped frame having the forward free end of its extensions provided with beveled ground engaging shoes, a supplemental frame secured on the main frame, a drum having bearing in the supplemental frame, side plates secured to the opposite sides of the main frame, stub axles carried by said frame and the said side plates, wheels mounted upon the said stub axles on which the frame is portable when the extensions of the main frame are lifted from the ground, anchoring connections leading rearwardly from the lower portions of the said side plates, a pulley carrying connection secured at its rear ends to the upper forward portions of the said side plates and having a forwardly extending free end, and a hitch piece carried by the said plate attaching connection with which the free end of the drum actuated cable has an adjustable connection.

2. A stump puller comprising a main U-shaped frame having the forward free end of its extensions provided with beveled ground engaging shoes, a supplemental frame secured on the main frame, a drum having bearing in the supplemental frame, side plates secured to the opposite sides of the main frame, stub axles carried by portions of said main frame and the said side plates, wheels mounted upon the said stub axles on which the frame is portable when the extensions of the main frame are lifted from the ground, anchoring connections secured to and leading rearwardly from the lower portions of the said side plates, and a pulley carrying connection secured at its rear ends to the forward portions of the said side plates in a plane substantially above the anchoring connection and having a forwardly extending free end.

3. A stump puller comprising a main U-shaped frame, a supplemental U-shaped frame secured to the main frame, upstanding side brackets secured to said frames, a drum journaled between the side portions of the frames, a stump pulling cable attached to the drum and having one free end, handle bars having journaled connections in the said upright brackets and operatively connected to the drum for rotating the latter, side plates secured to opposite sides of the frames, anchoring connections leading rearwardly from the said side plates, and connections leading forwardly from the side plates and having means with which the free end of the said drum cable is adjustably attachable.

4. A stump puller comprising a main U-shaped frame, a supplemental U-shaped frame secured to the main frame, upstanding side brackets secured to said frames, a drum journaled between the side portions of the frames, a stump pulling cable attached to the drum and having one free end, handle bars having journaled connections in the said upright brackets and operatively connected to the drum for rotating the latter, side plates secured to opposite sides of the frames, anchoring connections leading rearwardly from the said side plates, connections leading forwardly from the side plates and provided at their forward portions with a cable attaching member, and a stump attaching cable having a block through which the drum actuated cable is extended for adjustable connection with the said attaching means.

5. A stump puller comprising a main U-shaped frame, a supplemental U-shaped frame secured to the main frame, upstanding side brackets secured to said frames, a drum journaled between the side portions of the frames, a stump pulling cable attached to the drum and having one free end, handle bars having journaled connections in the said upright brackets and operatively connected to the drum for rotating the latter, side plates secured to opposite sides of the frames, anchoring connections leading rearwardly from the said side plates, and connections leading forwardly from the side plates and having means with which the free end of the said drum cable is adjustably attachable, stub axles supported by the main frame and the said side plates at opposite sides of the frame, and wheels mounted upon said stub axles on which the frame is movable from place to place.

In testimony whereof I have affixed my signature.

JOHN HENRY ROSEMEYER.